(12) United States Patent
Deligne et al.

(10) Patent No.: US 8,041,561 B2
(45) Date of Patent: *Oct. 18, 2011

(54) MULTI-CHANNEL CODEBOOK DEPENDENT COMPENSATION

(75) Inventors: Sabine Deligne, White Plains, NY (US); Ramesh A. Gopinath, Millwood, NY (US)

(73) Assignee: Nuance Communications, Inc., Burlington, MA (US)

( * ) Notice: Subject to any disclaimer, the term of this patent is extended or adjusted under 35 U.S.C. 154(b) by 1021 days.

This patent is subject to a terminal disclaimer.

(21) Appl. No.: 11/930,822

(22) Filed: Oct. 31, 2007

(65) Prior Publication Data

US 2008/0059180 A1    Mar. 6, 2008

Related U.S. Application Data

(63) Continuation of application No. 09/808,312, filed on Mar. 14, 2001, now Pat. No. 7,319,954.

(51) Int. Cl.
*G10L 19/14* (2006.01)
(52) U.S. Cl. ................................... 704/224
(58) Field of Classification Search ............... 704/224, 704/225
See application file for complete search history.

(56) References Cited

U.S. PATENT DOCUMENTS

| | | | |
|---|---|---|---|
| 4,537,200 A | | 8/1985 | Widrow |
| 5,309,378 A | * | 5/1994 | Beierle ............... 700/280 |
| 5,487,129 A | | 1/1996 | Paiss et al. |
| 5,539,832 A | | 7/1996 | Weinstein et al. |
| 5,590,241 A | | 12/1996 | Park et al. |
| 5,590,242 A | * | 12/1996 | Juang et al. ............... 704/245 |
| 5,598,505 A | | 1/1997 | Austin et al. |
| 5,737,485 A | * | 4/1998 | Flanagan et al. ........... 704/232 |
| 5,745,872 A | * | 4/1998 | Sonmez et al. ............. 704/222 |
| 5,781,883 A | * | 7/1998 | Wynn ............... 704/226 |
| 5,924,065 A | | 7/1999 | Eberman et al. |
| 5,956,679 A | | 9/1999 | Komori et al. |
| 6,157,909 A | | 12/2000 | Mauuary et al. |
| 6,487,295 B1 | | 11/2002 | Lofgren et al. |
| 7,319,954 B2 | * | 1/2008 | Deligne et al. ............. 704/224 |

OTHER PUBLICATIONS

E.Weinstein et al., "Multi-channel signal separation by decorrelation", IEEE transactions on Speech and Audio Processing, vol. 1, No. 4, Oct. 1993.
Rabiner et al., "Fundamentals of Speech Recognition", Prentice Hall Signal Processing Series, Alan V. Oppenheim, Series Editor.1993.
L.R. Bahl et al., "Performance of the IBM Large Vocabulary Continuous Speech Recognition System on the ARPA Wall Street Journal Task", Proceedings of ICASSP 1995, vol. 1, pp. 41-44, 1995.
A. Acero, "Acoustical and Environmental Robustness in Automatic Speech Recognition", PhD thesis, Department of Electrical and Computer Engineering, Carnegie Mellon University, Pittsburgh, Pennsylvania 15213, Sep. 1990.
Rabiner et al., "Fundamentals of Speech Recognition", Prentice Hall Signal Processing Series, Alan V. Oppenheim, Series Editor, Chapter 3, 1993.
A. A. Ammar, et al, Reference-Free Interference Cancellation Using Cross-Couple Scheme, Feb. 22-24, 2000, Minufiya University, Egypt, p. 7.

* cited by examiner

*Primary Examiner* — Michael N Opsasnick
(74) *Attorney, Agent, or Firm* — Wolf, Greenfield & Sacks, P.C.

(57) ABSTRACT

Methods and apparatus, in the context of speech recognition, for compensating in the cepstral domain for the effect of an interfering signal by using a reference signal.

9 Claims, 3 Drawing Sheets

MULTI-CHANNEL CODEBOOK DEPENDENT COMPENSATION

CROSS REFERENCE TO RELATED APPLICATIONS

This application is a continuation application of U.S. patent application Ser. No. 09/808,312 filed on Mar. 14, 2001, now U.S. Pat. No. 7,319,954,the contents of which are hereby incorporated by reference in its entirety.

FIELD OF THE INVENTION

The present invention generally relates to the multi-channel separation of a desired signal and of an interfering signal, by using a reference signal. More particularly, the present invention relates to the separation of a speech signal (the desired signal) and of an interfering signal, in the context of speech recognition applications, in the case where a mixture of the speech and of the interfering signal is recorded in one channel, and where the interfering signal is recorded in a second channel (the reference signal).

BACKGROUND OF THE INVENTION

Robustness in the presence of noise and, more generally, of interfering signals is a crucial issue normally addressed in connection with speech recognition, especially when performance in a real-world environment is concerned. In cases where the signal interfering with the speech is stationary and where its characteristics are known in advance, robustness issues can, to a certain extent, be addressed during the training of the system. Particularly, the acoustic model of the speech recognition system can be trained on a representative collection of noisy data ; this approach is known as "multi-style training" and has been shown to reduce the degradation of the recognition accuracy in the presence of noise.

However, in most applications, the signal corrupting the speech is neither known in advance nor stationary (for example, music or speech from competing speakers). Such cases typically cannot be handled by devising special training schemes, and they tend to require the use of on-line adaptive algorithms.

Particular needs have been recognized in connection with addressing the problem of separating a speech signal and an interfering signal (e.g. non stationary noise, music, competing speech) in the case where a recording of the interfering signal is available in a second channel. The signal contained in this second channel is called the reference signal. This occurs in a variety of contexts, such as:

- when the speech signal is corrupted by the sound emitted by a radio or a CD player (the reference signal is recorded at the output of the radio or CD player),
- in telephony applications where the speech prompt synthesized by the speech server interferes with the speech of the user (the reference signal is the recording of the prompt), or
- when the speech signal is mixed with the speech of a competing speaker (the reference signal is recorded from the microphone of the competing speaker).

To date, various efforts have been made in the contexts just described, yet various shortcomings and disadvantages have been observed.

Conventionally, the problem of separating a desired signal and an interfering signal with a known reference signal is often addressed by using decorrelation filtering techniques (see Ehud Weinstein, Meir Feder and Alan V. Oppenheim, "Multi-channel signal separation by decorrelation", IEEE transactions on Speech and Audio Processing, volume 1, number 4, October 1993). The model underlying the conventional decorrelation filtering approach is illustrated in FIG. 1. Referring to FIG. 1, the cross-coupling effect between two channels is modeled with a 2×2 linear system, where:

the two input channels are: $s_1$ the waveform of the desired signal, and $s_2$ the waveform of the interfering signal; and
the two output channels are: $o_1$ the observed waveform of the mixture of the desired and interfering signals, and $o_2$ the observed waveform of the reference signal.

The transfer function within each channel (from $s_1$ to $o_1$, and from $s_2$ to $o_2$) is assumed to be an identity system. Besides, it is assumed that there is no leakage of the desired signal $s_1$ into the reference sensor, i.e., the cross-coupling function from the input channel of $s_1$ to the output channel of $o_2$ is zero. Under theses assumptions, the linear system reduces to the cross-coupling between the input channel of $s_2$ and the output channel of $o_1$. In decorrelation filtering techniques, the linear system is estimated with an iterative algorithm so that, by performing inverse filtering, the reconstructed signals $s_1$ and $s_2$ in the input channels are statistically uncorrelated. It can be shown that under the above assumptions, the linear system can be identified unambiguously. Once the linear system is identified, it is used to cancel the interfering signal component in the observed mixture.

The decorrelation filtering approach does suffer from some limitations in the context of a speech recognition application, such as:

- it performs in the waveform domain, on a sample basis, thus leading to a high computation rate,
- it might take some time before the iterative decorrelation algorithm converges towards an accurate estimate of the linear system, and
- the length of the decorrelating filter in the linear system is unknown and needs to be hypothesized a priori.

Another conventional approach, the Codeword-Dependent Cepstral Normalization (CDCN) approach, is a mono-channel technique which is used during speech recognition to compensate for the combined effect of stationary noise and channel mismatch. (See Alejandro Acero, "Acoustical and Environmental Robustness in Automatic Speech Recognition", PhD thesis, Department of Electrical and Computer Engineering, Carnegie Mellon University, Pittsburgh, Pa. 15213, September 1990.) CDCN does not operate in the waveform domain but, instead, in the cepstral domain, which is the domain where speech recognition is usually performed. A cepstra (see chapter 3 in L. Rabiner and B. H. Juang, *Fundamentals of Speech Recognition*, Prentice Hall Signal Processing Series, 1993) is a vector that is computed by the front end of a speech recognition system from the log-spectrum of a segment of speech waveform samples (usually this segment is about 100 ms long). The stream of cepstra corresponding to a speech utterance is typically computed from successive overlapping segments of the speech waveform samples (usually the shift between two adjacent segments is about 10 ms). In the CDCN framework, the cepstra of the noise is estimated by minimizing the difference between the cepstral space of the current utterance and the cepstral space of the clean speech ("clean speech" meaning non-noisy speech) characterized by a codebook of cepstral vectors. As the sources of mismatch are assumed to be stationary, the estimation is performed by averaging over the whole utterance.

Among the limitations of the mono-channel CDCN approach, though, is that non-stationary noise is not taken into account as accurately and effectively as may be possible.

Particularly, a fundamental assumption of the mono-channel CDCN approach is that the noise is relatively stationary over periods of at least one or even a few seconds. The shorter the period during which the noise can be considered stationary, the more poorly conventional CDCN will perform. In the case of highly non-stationary noises, such as music, the mono-channel CDCN framework may even degrade the speech recognition accuracy instead of improving it.

Also included among conventional techniques are two-channel compensation techniques that operate in the cepstral domain (see Acero, supra). Such techniques can be characterized as follows:

one channel contains speech recorded in the environment matching the recognition system, and the other channel contains speech recorded in a mismatching environment (the usual source of mismatch is the use of a different microphone);

the two-channel data are used in a training scheme for the purpose of learning compensation vectors between the matching and the mismatching environments (the compensation vectors are looked up in a table during the recognition process); and the source of mismatch in the second channel is assumed to be stationary: a predefined number of (SNR-dependent or codeword-dependent) compensation vectors are estimated by averaging over all the frames of the two-channel data; the problem of non-stationary noise is not addressed.

Accordingly, similar disadvantages are encountered as in the case of the other conventional techniques described.

Consequently, and in brief recapitulation, various needs have been recognized in connection with overcoming the shortcomings and disadvantages observed in connection with conventional techniques.

SUMMARY OF THE INVENTION

In accordance with at least one presently preferred embodiment of the present invention, it is proposed that the effect of the interfering signal in the cepstral domain be compensated for.

Assuming that $y_1$ is the cepstra of the desirable signal (i.e. the clean speech) and that $x_2$ is the cepstra of the interfering signal, it is well known in the field of speech processing that the cepstra $x_1$ of the observed mixed signal can be computed as $x_1 = y_1 + f(y_1, x_2)$, where "f" is a known non linear function of both the cepstra of the clean speech and of the interfering signal. In at least one embodiment of the present invention, the cepstra $x_2$ of the interfering signal is computed from the reference signal. For lack of knowing the cepstra $y_1$ of the clean speech, the compensation term $f(y_1, x_2)$ is preferably estimated by following the Codeword Dependent Cepstral Normalization (CDCN) approach described heretofore, such that $f(y_1, x_2)$ is approximated with its expected value over $y_1$, where $y_1$ takes its values in a predefined codebook of cepstral vectors characterizing the cepstral space of the clean speech.

In accordance with at least one presently preferred embodiment of the present invention, the following advantages are presented in comparison with the conventional decorrelation filtering approach described further above:

performance is in the cepstral domain, on a frame basis, thus drastically reducing the computation rate (for example, in a 10 ms frame system operating on 11 kHz data, the compensation on the cepstra is applied every 110 samples, instead of every sample in the waveform domain), no iterative estimation scheme is involved, so that implementation in real time is possible, and no a priori hypothesis is required on the coupling system between the speech and the interfering signal.

Furthermore, since operation in the cepstral domain is contemplated, at least one embodiment of the present invention makes it especially appropriate for speech recognition applications that use this front end.

In comparison with CDCN as described heretofore, at least one presently preferred embodiment of the present invention involves a two-channel approach, where the cepstra of the noise is computed on a frame basis from the reference signal in the second channel. Therefore, unlike the CDCN approach, at least one embodiment of the present invention aims at compensating for the effect of both stationary and non stationary noise.

In comparison with conventional two-channel compensation techniques operating in the cepstral domain as described heretofore, a two-channel compensation technique in accordance with at least one presently preferred embodiment of the present invention has the following characteristics:

one channel contains speech recorded in a mismatching environment, and the other channel contains solely the source of mismatch (the source of mismatch here is thus assumed to be recordable: single source of noise, music, competing speech), the two-channel data are used in a decoding scheme, during the recognition process, the source of mismatch in the second channel is not assumed to be stationary: a new compensation vector is estimated for each input pair of frames.

In one aspect, the present invention provides an apparatus for compensating for interference in speech recognition, the apparatus comprising: a first input medium which obtains an initial speech signal; a second input medium which obtains at least one interfering signal; a normalizing arrangement which reconciles the initial speech signal and at least one interfering signal with one another to produce a final speech signal; and the normalizing arrangement being adapted to account for non-stationary noise in the at least one interfering signal.

In another aspect, the present invention provides a method of compensating for interference in speech recognition, the method comprising the steps of: obtaining an initial speech signal; obtaining at least one interfering signal; and reconciling the initial speech signal and at least one interfering signal with one another to produce a final speech signal; the reconciling step comprising the step of accounting for non-stationary noise in the at least one interfering signal.

Furthermore, in an additional aspect, the present invention provides a program storage device readable by machine, tangibly embodying a program of instructions executable by the machine to perform method steps for compensating for interference in speech recognition, the method comprising the steps of: obtaining an initial speech signal; obtaining at least one interfering signal; and reconciling the initial speech signal and at least one interfering signal with one another to produce a final speech signal; the reconciling step comprising the step of accounting for non-stationary noise in the at least one interfering signal.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
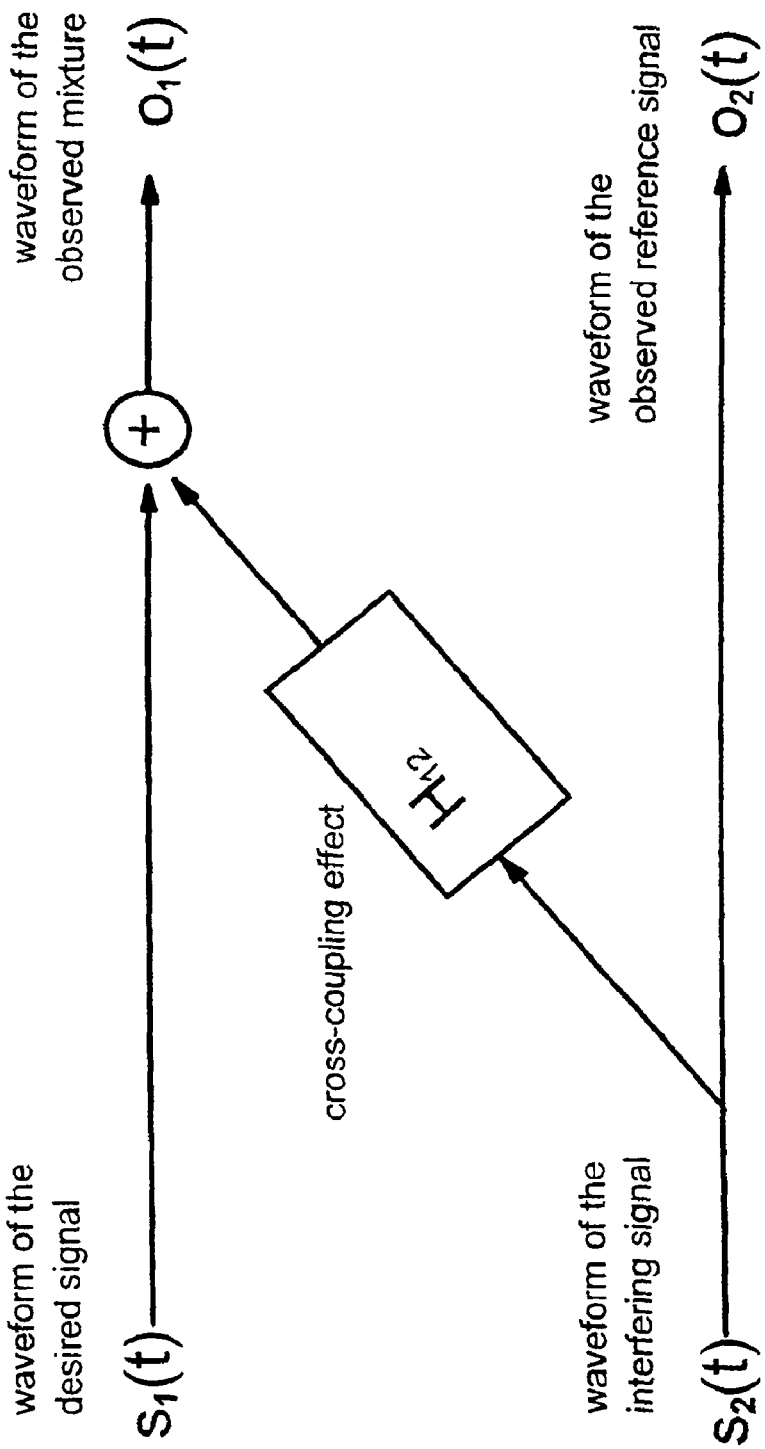
FIG. 1 schematically illustrates a model which underlies a conventional decorrelation filtering approach.
Figure 2:
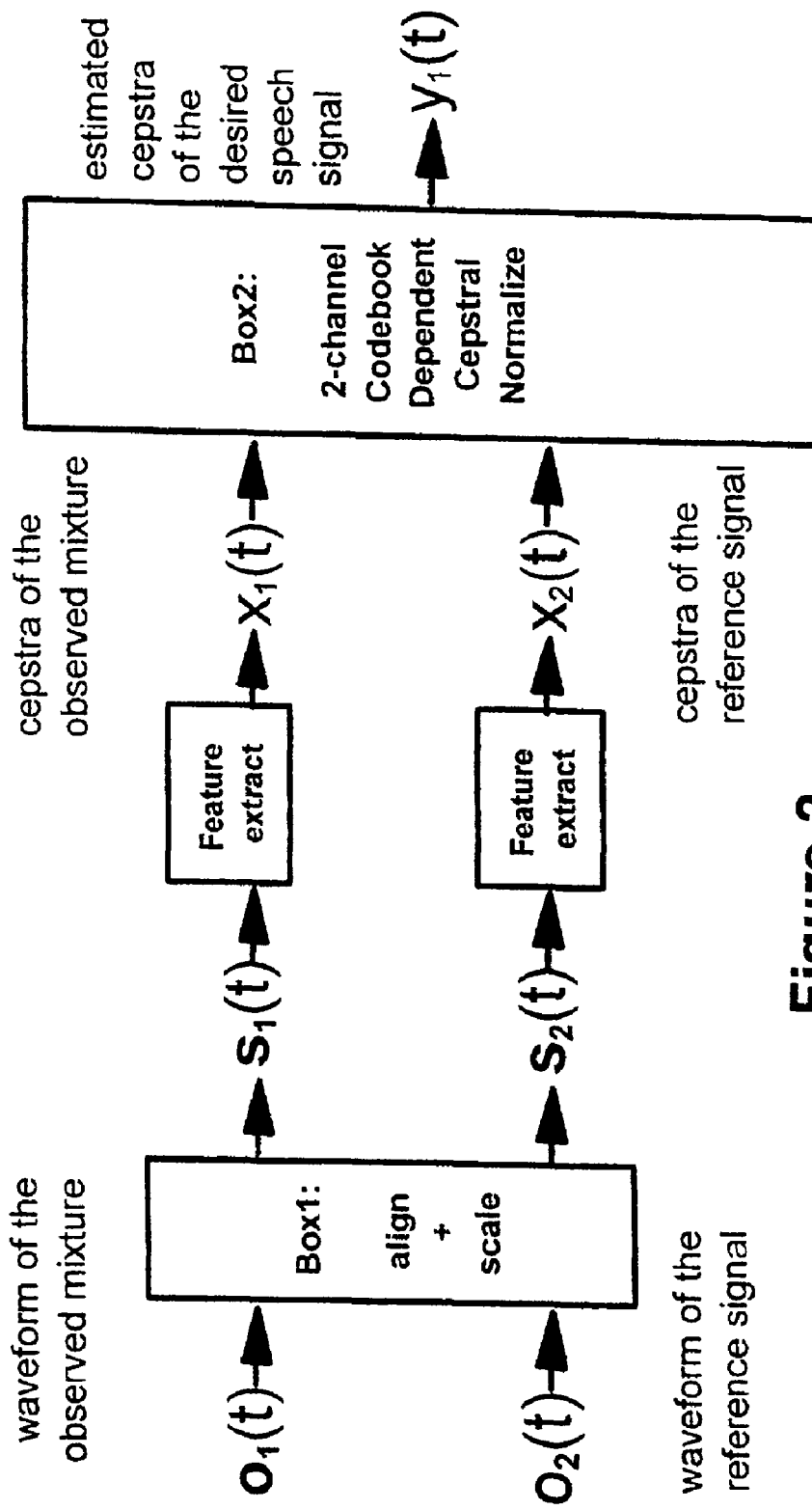
FIG. 2 schematically illustrates the integration of the two-channel codebook dependent cepstral normalization scheme in the context of speech recognition.

FIG. 2 shows a speech recognition system operating in an environment where a signal interferes with the speech of the users. It illustrates how the proposed compensation scheme is integrated in the overall recognition procedure. The two input signals are $o_1$ the waveform of the mixture of speech and interfering signal recorded in a first channel, and, $o_2$ the waveform of the interfering signal recorded in a second channel. At Box 1 in FIG. 2, a time-alignment and a scaling of the two input waveforms are performed in order to compensate for the possible difference in delay and in amplitude between the two input channels. The relative delay between the two channels is estimated by detecting the maximum of the cross-correlation function between the two input waveforms. The scaling factor between the amplitudes in the two channels is estimated by computing a mean value over segments of non speech samples in each waveform (for example on the segments preceding the speech), and by taking the ratio of the two means. The estimated scaling factor is used to set the two input waveforms to the same amplitude scale. The alignment and scaling pre-processing step results in two waveforms $s_1$ and $s_2$. This preliminary step, which corresponds to a simple form of adaptive filtering of the two input waveforms $o_1$ and $o_2$, is required in order for the two-channel CDCN scheme to perform well. A more refined adaptive filtering that would still include the alignment and scaling operations (like the adaptive decorrelation filtering outlined in the prior art section for example) could be devised instead, but it is not a requirement. Standard cepstral features are computed from each of the aligned and scaled waveforms, resulting in the cepstra of the mixed signals $x_1$, and in the cepstra of the reference signal $x_2$. Box 2 performs the two-channel CDCN on the two input streams of cepstra $x_1$ and $x_2$, and it outputs the estimated cepstra of the desired speech $y_1$.

Figure 3:
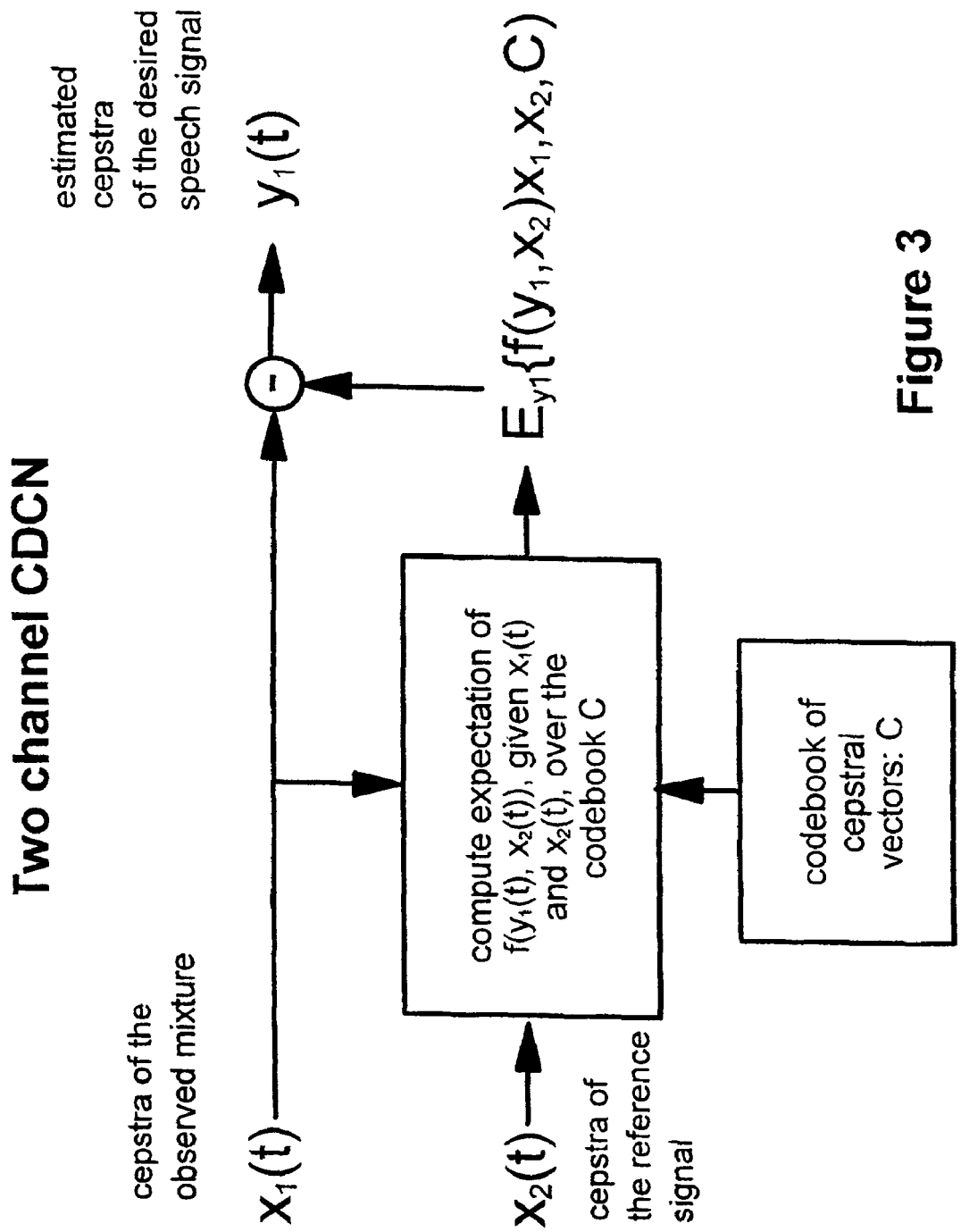
FIG. 3 illustrates how the two-channel codebook dependent cepstral normalization procedure operates on the cepstra of the input mixed and reference signals to provide an estimate of the cepstra of the desired speech signal.

FIG. 3 illustrates the principle of the two-channel CDCN. The goal of the two-channel CDCN is to provide an estimate $y_1$ of the cepstra of the desirable speech signal from the cepstra $x_1$ of the mixed speech and the cepstra $x_2$ of the interfering signal. Assuming that the interfering signal is additive in the waveform domain, it is known that the relation between $y_1$, $x_1$ and $x_2$ at each time index t can be written as $$y_1(t) = x_1(t) - f(y_1(t), x_2(t)),$$

where $f(y,x) = DCT^* \log(1 + \exp(\text{inv}DCT(x-y)))$, where DCT refers to the Discrete Cosine Transform, where invDCT refers to the inverse Discrete Cosine Transform, and where log and exp refer respectively to the logarithmic and exponential operations.

For lack of knowing the cepstra $y_1$ of the clean speech, the principle of the CDCN approach is to approximate the compensation term $f(y_1, x_2)$ with its expected value over $y_1$, given $x_1$ and $x_2$. The calculation of the expectation is carried out by assuming that $y_1$ takes its values in a predefined codebook C consisting of cepstral codeword vectors $\{c_i\}$ characterizing the acoustic space of the clean speech:

$$E_{y1}\{f(y_1,x_2)|x_1,x_2,C\} = \Sigma_i p(c_i|x_1,x_2) f(c_i,x_2)$$

And the cepstra of the desired speech signal is estimated as:

$$y_1(t) = x_1(t) - E_{y1}\{f(y_1,x_2)|x_1,x_2,C\}$$

Note that in the conventional mono-channel CDCN scheme, the interfering signal is assumed to be stationary and its cepstra $x_2$ is estimated either by averaging non-speech frames, or by applying an EM algorithm over all the frames of each utterance. On the other hand, in the two-channel CDCN scheme according to at least one embodiment of the present invention, the assumption of stationarity is removed and the cepstra $x_2$ of the interfering signal is estimated as the cepstra of the reference signal in the second channel.

The disclosure now turns to a general overview of a procedure that may be employed in accordance with at least one embodiment of the present invention.

As far as off line requirements go, one may preferably build a codebook C of cepstral codeword vectors characterizing the cepstral space of the desired speech signal; this can be done by vector-quantizing a set of training utterances that have been pronounced in a non-noisy environment.

For pre-processing of the waveforms, one may preferably:
  estimate the relative delay between the 2 input channels from the cross-correlation function of the 2 input waveforms $s_1$ and $s_2$,
  time-align the two input waveforms based on the estimated relative delay,
  estimate the ratio of the amplitude levels in the two channels, and
  scale the two input waveforms to the same amplitude based on the estimated amplitude ratio.

For feature extraction, one may preferably compute standard cepstral vectors $x_1$ and $x_2$ from the time-aligned and scaled input waveforms $s_1$ and $s_2$.

For two-channel CDCN compensation, for each input pair of cepstral vectors $x_1$ and $x_2$, one may preferably:
  estimate the compensation term by taking its expectation value over all codewords $c_i$ in the codebook C:

$$E_{y1}\{f(y_1,x_2)|x_1,x_2,C\} = \Sigma_i p(c_i|x_1,x_2) f(c_i,x_2); \text{ and}$$

estimate the cepstra of the desired speech as $$y_1 = x_1 - E_{y1}\{f(y_1,x_2)|x_1,x_2,C\}$$

Preferably, one may then decode the speech from the estimated cepstra $y_1$.

Elaborating now on a preferred method of employing at least one embodiment of the invention, as pointed out heretofore, the two-channel CDCN scheme requires that the two input waveforms be previously time-aligned and scaled. In experiments that have been performed, time-alignment was performed by detecting the maximum of the cross-correlation function between the two waveforms. The scaling factor was estimated as the ratio between the means computed in each channel over non speech segments of about 450 ms (10,000 samples at 22 kHz).

As will be seen herebelow, experiments were conducted with codebooks of different sizes. As far as the test data are concerned, a codebook of 64 codewords appears to correspond to an optimal trade-off between recognition accuracy and complexity. Smaller codebooks (down to 8 codewords), leading to further reduced computation requirements, still provide significant improvement of the recognition accuracy over the baseline recognition scores.

The disclosure now turns to an evaluation of an embodiment of the invention as employed in the context of speech recognition in a car, where the signal interfering with the speech is the music played by the CD player of the car. The evaluation protocol is first explained, and then the recognition scores, obtained before and after the two-channel CDCN scheme according to an embodiment of the invention is applied, are compared.

The test data in the experiments included stereo recordings in a non-moving car, where a male subject is asked to utter digit strings while the CD player of the car is playing rock'n'roll music. The first channel comes from an AKG Q400 microphone mounted on the visor of the car, and recording the voice of the subject and the music from the car speakers. The second channel contains the music recorded directly from the output of the CD player. All the data are recorded at 22 kHz and downsampled to 11 kHz.

The test data include four subsets, each of which corresponds proportionally to an increased volume of music: 3, 5, 7 and 10 (10 corresponds to the loudest volume of the CD player of the car used in these experiments). The speech in all the subsets is uttered by the same male speaker, and each subset contains 24 sentences of either seven or eleven digits, so that the total number of sentences in the test data is 96.

The speech recognition system used in the experiments is particularly configured to be used in portable devices, or in automotive applications. It includes a set of speaker-independent acoustic models (156 subphones covering the phonetics of English) with about 9,000 context-dependent gaussians (triphone contexts tied by using a decision tree) (see L. R. Bahl et al., Performance of the IBM Large Vocabulary Continuous Speech Recognition System on the ARPA Wall Street Journal Task, Proceedings of ICASSP 1995, volume 1, pp. 41-44, 1995), trained on a few hundred hours of general English speech (about half of these training data has either digitally added car noise, or was recorded in a moving car at 30 and 60 mph). The front end of the system computes 12 cepstra+the energy+delta and delta-delta coefficients from 15 ms frames using 24 mel-filter banks; see chapter 3 in Rabiner et al., supra).

The codebook of cepstral vectors characterizing the cepstral space of the clean speech was obtained (prior to experimentation) by quantizing a collection of a few thousand sentences uttered by both males and females and recorded with an AKG Q400 microphone in a non-moving car and in a non-noisy environment (especially, with no music being played), using the same setup as for the test data. The quantization was performed by using a splitting algorithm, where the distance between a cepstral vector and a cepstral codeword is computed with a Malahanobis distance (a weighted Euclidean distance) with a diagonal covariance matrix tied over all codewords (see chapter 5, section 5.2.2 in Rabiner et al., supra). The dimension of the cepstra was 24, as determined by the number of mel-filters in the front end of the speech recognition system. Codebooks of different sizes were experimented with, particularly, codebooks containing either 2, 4, 8, 16, 32, 64, 128, 256 codewords.

In accordance with an embodiment of the present invention, the two input waveforms are preferably time-aligned and scaled by following the procedure described heretofore with relation to FIGS. 2 and 3. The cross-correlation function $R_{o_1 o_2}(t)$ between the two waveforms $o_1$ and $o_2$, is computed for t ranging from −1000 to +1000, and the relative delay between the two channels is approximated by the value of t for which $R_{o_1 o_2}(t)$ reaches its maximum. With the two channels experimented in the scope of this evaluation, the relative delay was usually found to range from 4 to 5 ms (i.e. from about 40 to 60 samples at 11 kHz). Since the front end of the recognition system computes cepstra over 15 ms frames (i.e. 165 samples long segments), it can be expected that an error limited to a few samples on the estimation of the relative delay will have very little influence on performance.

The scaling factor between the amplitudes in the two channels is preferably estimated by computing the mean values of non speech segments about 450 ms long, in each channel, and by computing the ratio between the mean values.

The two-channel CDCN scheme is preferably applied as described heretofore in connection with FIGS. 2 and 3, and in connection with the procedural overview.

In Table 1 below, shown are the Word Error Rates obtained after decoding the test data. Each column correspond to given volume of music. In the first row, shown is the WER obtained when no compensation at all is applied. In the other rows, shown is the WER obtained by using the two-channel CDCN scheme with codebooks of size 2, 4, 8, 16, 32, 64 and 128.

The two channel CDCN scheme allows to significantly reduce the WER at all music volumes, and for each size of codebook. The codebook with 64 codewords seems to correspond to an optimal trade-off between the recognition accuracy and computational requirements. Smaller codebooks still yield significant improvements over the baseline scores, with a reduced computational load.

TABLE 1

|  | Vol. 3 | Vol. 5 | Vol. 7 | Vol. 10 |
| --- | --- | --- | --- | --- |
| Baseline | 0.5 | 4 | 5.5 | 39.7 |
| 2 | 0 | 1.5 | 2.7 | 12.7 |
| 4 | 0.5 | 0.5 | 3.7 | 12.3 |
| 8 | 0.5 | 0.5 | 2.3 | 10.8 |
| 16 | 0 | 1.5 | 2.3 | 7.4 |
| 32 | 0 | 1 | 2.7 | 7.8 |
| 64 | 0 | 1.5 | 3.7 | 4.4 |
| 128 | 0 | 1 | 3.2 | 7.4 |
| 256 | 0 | 1 | 2.7 | 7.8 |

It is to be understood that the present invention, in accordance with at least one presently preferred embodiment, includes a first input medium which obtains an initial speech signal, a second input medium which obtains at least one interfering signal, and a normalizing arrangement which reconciles the initial speech signal and at least one interfering signal with one another to produce a final speech signal. Together, the first input medium, second input medium and normalizing arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for compensating for interference in speech recognition, said apparatus comprising:

a first input device which obtains an initial speech signal;

a second input device which obtains at least one interfering signal, wherein said one interfering signal is not statistically independent of said initial speech signal;

a normalizing arrangement which reconciles the initial speech signal and at least one interfering signal with one another to produce a final speech signal;

said normalizing arrangement being adapted to account for non-stationary noise in the at least one interfering signal;

wherein said reconciliation can be done in real-time;

wherein said normalizing arrangement utilizes a multi-channel codeword-dependent cepstral normalization;

wherein said normalizing arrangement is adapted to estimate at least one characteristic of the at least one reference signal given at least one characteristic of the initial speech signal;

wherein said normalizing arrangement is further adapted to refer to a single codebook in estimating at least one characteristic of the at least one reference signal;

wherein said normalizing arrangement is adapted to apply a compensation term to the initial speech signal in reconciling the initial speech signal and at least one interfering signal with one another; and wherein said normalizing arrangement is adapted to estimate the compensation term via assessing its expectation value over a plurality of codewords in the codebook.

2. The apparatus according to claim 1, wherein said first input device is adapted to obtain the initial speech signal in an environment where noise corresponding to the at least one interfering signal is present and said noise is not linearly time invariant coupled to said initial speech signal.

3. The apparatus according to claim 2, wherein said second input device is adapted to obtain solely the at least one interfering signal.

4. The apparatus according to claim 1, wherein the final speech signal is a clean speech signal.

5. A method of compensating for interference in speech recognition, said method comprising the steps of:

obtaining an initial speech signal;

obtaining at least one interfering signal, wherein said one interfering signal is not statistically independent of said initial speech signal;

reconciling the initial speech signal and at least one interfering signal with one another to produce a final speech signal;

said reconciling step comprising the step of accounting for non-stationary noise in the at least one interfering signal;

wherein said reconciliation can be done in real-time;

wherein said normalizing arrangement utilizes a multi-channel codeword-dependent cepstral normalization;

wherein said reconciling step comprises the step of estimating at least one characteristic of the at least one reference signal given at least one characteristic of the initial speech signal;

wherein said estimating step comprises referring to a single codebook;

wherein said reconciling step comprises the step of applying a compensation term to the initial speech signal; and wherein said estimating step comprises estimating the compensation term via assessing its expectation value over a plurality of codewords in the codebook.

6. The method according to claim 5, wherein said step of obtaining an initial speech signal comprises obtaining the initial speech signal in an environment where noise corresponding to the at least one interfering signal is present and said noise is not linearly time invariant coupled to said initial speech signal.

7. The method according to claim 6, wherein said step of obtaining at least one interfering signal comprises obtaining solely the at least one interfering signal.

8. The method according to claim 5, wherein the final speech signal is a clean speech signal.

9. A program storage device readable by machine, tangibly embodying a program of instructions executable by the machine to perform method steps for compensating for interference in speech recognition, said method comprising the steps of:

obtaining an initial speech signal;

obtaining at least one interfering signal, wherein said one interfering signal is not statistically independent of said initial speech signal;

reconciling the initial speech signal and at least one interfering signal with one another to produce a final speech signal;

said reconciling step comprising the step of accounting for non-stationary noise in the at least one interfering signal;

wherein said reconciliation can be done in real-time;

wherein said normalizing arrangement utilizes a multi-channel codeword-dependent cepstral normalization;

wherein said reconciling step comprises the step of estimating at least one characteristic of the at least one reference signal given at least one characteristic of the initial speech signal;

wherein said estimating step comprises referring to a single codebook;

wherein said reconciling step comprises the step of applying a compensation term to the initial speech signal; and wherein said estimating step comprises estimating the compensation term via assessing its expectation value over a plurality of codewords in the codebook.

* * * * *